United States Patent [19]

Erin et al.

[11] Patent Number: 5,192,493
[45] Date of Patent: Mar. 9, 1993

[54] MEDIAN SIGNAL SELECTOR FOR FEEDWATER CONTROL SYSTEMS

[75] Inventors: Lawrence E. Erin, Monroeville; William J. Catullo, Jr., Plum Boro; Richard E. Paris, Monroeville; John M. Gallagher, Mt. Lebanon, all of Pa.

[73] Assignee: Westinghouse Electric Corp., Pittsburgh, Pa.

[21] Appl. No.: 400,837

[22] Filed: Aug. 30, 1989

[51] Int. Cl.⁵ .................................................. G21C 7/32
[52] U.S. Cl. .................................... 376/211; 376/215; 376/241; 376/391
[58] Field of Search .............. 376/211, 216, 215, 241, 376/391, 402; 60/644.1, 665, 667; 122/504; 976/DIG. 299, DIG. 301

[56] References Cited

U.S. PATENT DOCUMENTS

| | | | |
|---|---|---|---|
| 3,518,974 | 7/1970 | Bradley | 376/211 |
| 4,105,496 | 8/1978 | Therond | 376/259 |
| 4,231,328 | 11/1980 | Lang et al. | 122/504 |
| 4,290,850 | 9/1981 | Omori et al. | 376/210 |
| 4,424,186 | 1/1984 | Cook | 376/211 |
| 4,427,620 | 1/1984 | Cook | 376/216 |
| 4,478,783 | 10/1984 | Broadwater | 376/211 |
| 4,738,818 | 4/1988 | Cantineau | 376/211 |
| 4,797,670 | 1/1989 | Joyner | 340/825 |
| 4,832,898 | 5/1989 | Miranda | 376/211 |

Primary Examiner—Donald P. Walsh
Assistant Examiner—Meena Chelliah
Attorney, Agent, or Firm—Z. L. Dermer

[57] ABSTRACT

A system for improving the performance of nuclear power plant feedwater control systems and simplifying steam generator low water level reactor protection logic includes a plurality of water level channels for measuring steam generator water level and generating a plurality of signals representative thereof. The median steam generator water level signal is selected from among the plurality of steam generator water level signals. The median steam generator water level signal is then communicated to the feedwater control system through an output interface.

12 Claims, 4 Drawing Sheets

MEDIAN SIGNAL SELECTOR FOR FEEDWATER CONTROL SYSTEMS

BACKGROUND OF THE INVENTION

1. Field of the Invention

The present invention is directed generally to the improvement of the overall performance of nuclear power plant control systems and nuclear reactor protection systems and more specifically to improving the performance of feedwater control systems and eliminating the interaction between the feedwater control system and the reactor protection system.

2. Description of the Prior Art

In existing nuclear power plants, there are two ways to measure the water level within a steam generator. A narrow range span measures the usable water inventory within the normal range of operation while a wide range span measures the water level within the entire steam generator. This invention is directed exclusively to an apparatus and method which measures steam generator water level using the narrow range span. The narrow range span reactor protection system is comprised of two reactor trip mechanisms including a low-low water level trip and a low feedwater flow trip.

FIG. 1 illustrates the logic diagrams for both of these reactor trips. The low-low water level reactor trip operates with three water level channels 10, 11 and 12. Each water level channel 10, 11 or 12 measures steam generator water level independently. Water level signals 13, 14 and 15 generated by water level channels 10, 11 and 12, respectively, and representative of the water level in the steam generator are compared to a predefined steam generator water level set point by water level comparators 16, 17 and 18. Low-low water level signals 19, 20 and 21 from water level comparators 16, 17 and 18, respectively, are input to coincidence gate 22. A low-low water level indication from any two of signals 19, 20 and 21 will cause a signal 23 to be generated which is available at an output of coincidence gate 22 to thereby initiate a reactor trip. A reactor trip is accomplished by inserting control rods into the nuclear core to take the reactor to a subcritical state.

Water level signal 13 generated by water level channel 10 is also input through electrical isolation device 24 to a feedwater control system.

The low feedwater flow reactor trip operates with two steam flow channels 25 and 26 and two feedwater flow channels 27 and 28. Steam flow channel 25 and feedwater flow channel 27 reside in one protection set while steam flow channel 26 and feedwater flow channel 28 are from another redundant protection set. Steam flow signal 29 and feedwater flow signal 30 generated by steam flow channel 25 and feedwater flow channel 27, respectively, are input to flow comparator 31. Steam flow signal 32 and feedwater flow signal 33 generated by steam flow channel 26 and feedwater flow channel 28, respectively, are input to flow comparator 34. A mismatch between steam flow and feedwater flow such that feedwater flow is less by a predetermined magnitude than steam flow will cause low feedwater flow signals 35 and 36 to be generated at the outputs of flow comparators 31 and 34, respectively. These low feedwater flow signals 35 and 36 are input to OR gate 37. A signal 38 will be generated at an output of OR gate 37 whenever either signal 35 or 36 indicates a low feedwater flow condition.

Water level signals 14 and 15 from water level channels 11 and 12, respectively, are also input to water level comparators 39 and 40. Water level comparators 39 and 40 utilize water level set points equal to or greater than those utilized by water level comparators 16, 17 and 18. Low water level signals 41 and 42 from water level comparators 39 and 40, respectively, are input to OR gate 43. A low water level indication from either of low water level signals 41 or 42 will cause a signal 44 to be generated which is available at an output of OR gate 43.

Signals 38 and 44 are input to AND gate 45. A low water level indication from signal 44 and a low feedwater flow indication from signal 38 will cause a signal 46 to be generated which is available at an output of AND gate 45 to thereby initiate a reactor trip.

The Code of Federal Regulations, Title 10, Part 50.55a Codes and Standards, subpart (h) Protection Systems, endorses the Institute of Electrical and Electronics Engineers Standard IEEE-279 "Criteria for Protection Systems for Nuclear Power Generating Stations" as the governing criteria to which reactor protection system design must conform, as a minimum, in order to meet the requirements of functional adequacy and operational reliability. One of the specific provisions of standard IEEE-279 Paragraph 4.7.3 addresses the issue of control and protection system interaction and provides as follows:

"Single Random Failure. Where a single random failure can cause a control system action that results in a generating station condition requiring protective action and can also prevent proper action of a protection system channel designed to protect against the condition, the remaining redundant protection channels shall be capable of providing the protective action even when degraded by a second random failure."

From FIG. 1, it is evident that water level channel 10 is used both by the low-low water level reactor trip and by the feedwater control system. It is also evident that the other two water level channels 11 and 12 are used both by the low-low water level reactor trip and by the low feedwater flow reactor trip. This design conforms to the requirements established by standard IEEE-279. For example, failure in the high direction of the water level channel 10 indicating falsely that the water level within the steam generator is too high will generate feedwater control system action that results in a reduction of feedwater flow. Consequently, low steam generator water level protection may be subsequently required. This protective action is, however, derived from the remaining water level channels 11 and 12. For such a scenario, standard IEEE-279 imposes the consideration of an additional random failure in the reactor protection system. The underlying logic is that the initial protection system failure is considered the initiating event for the transient and, therefore, does not constitute the "single failure" standard IEEE-279 imposes on the protection system. As such, an additional protection system failure must be postulated to occur and the protection system must continue to be capable of initiating the appropriate protective action.

The second random failure in this instance would be a failure of one of the remaining water level channels 11 or 12. Such a failure would result in only one water level channel 11 or 12 remaining in operation which is not sufficient to satisfy the two out of three reactor trip logic implemented in the low-low water level reactor trip by coincidence gate 22. Nevertheless, presuming that the initial failure occurs in water level channel 10 which is aligned to the feedwater control system and causes a control system transient, and the second random failure is in either water level channel 1; or 12, it can be seen from FIG. 1 that a reactor trip can be accomplished through the low feedwater flow reactor trip logic. A water level signal 14 or 15 from water level channel 11 or 12, respectively, remaining in operation will cause a low water level signal 41 or 42 to be input to OR gate 43 and thus cause a signal 44 to be available at the output of OR gate 43. The steam flow/feedwater flow logic will operate as previously described to produce a low feedwater flow indication at signal 38. Thus, a signal 46 will be available at the output of AND gate 45 to initiate a reactor trip.

The low feedwater flow reactor trip logic is provided only to satisfy the requirements established by standard IEEE-279. This logic is not used for any other independent purpose of either reactor protection or feedwater system control. The low feedwater flow reactor trip logic introduces additional complexity into the steam generator water level protection scheme. At the same time, the use of only one water level channel 10 as an input to the feedwater control system is undesirable because failure of that single water level channel 10 causes feedwater control system transients requiring protective action. Accordingly, the need exists for a feedwater control system design that eliminates the need for the low feedwater flow reactor trip logic while at the same time improves the reliability of the feedwater control system.

SUMMARY OF THE INVENTION

The present invention is directed to a system for improving the performance of nuclear power plant feedwater control systems and simplifying steam generator low water level reactor protection logic. The system includes a plurality of water level channels for redundantly measuring steam generator water level and generating a plurality of signals representative thereof. The median steam generator water level signal is selected through microprocessor control from among the plurality of steam generator water level signals. The median steam generator water level signal is then communicated to the feedwater control system through an output interface.

One embodiment of the present invention is directed to a system for improving the performance of nuclear power plant feedwater control systems comprised of three water level channels for redundantly measuring steam generator water level and generating signals representative thereof. A microprocessor is programmed to select a median steam generator water level signal from among the three steam generator water level signals designated as Signal A, Signal B and Signal C.

The microprocessor first selects the high signal value as between Signal A and Signal B and stores this value in microprocessor memory as Signal D. The microprocessor then selects the high value as between Signal B and Signal C and stores this value in microprocessor memory as Signal E. The microprocessor next selects the high value as between Signal A and Signal C and stores this value in microprocessor memory as Signal F. The low signal value as between Signal D and Signal E is then selected and stored in microprocessor memory as Signal G. Finally, the low signal value as between Signal F and Signal G is selected and stored in microprocessor memory as the median steam generator water level signal. The median steam generator water level signal is then communicated to the feedwater control system through an output interface.

The median signal selector of the present invention provides a more reliable and efficient way to control the feedwater flow within a nuclear power plant steam generator. The median signal selector prevents the failure of a single water level channel from initiating a feedwater control system transient resulting in a nuclear power plant condition requiring protective action. Therefore, the median signal selector eliminates the need for the low feedwater flow reactor trip logic as well as improves the reliability of the feedwater control system. These and other advantages and benefits of the present invention will become apparent from the description of a preferred embodiment hereinbelow.

BRIEF DESCRIPTION OF THE DRAWINGS

In order that the present invention may be clearly understood and readily practiced, preferred embodiments will now be described, by way of example only with reference to the accompanying figures wherein.

DETAILED DESCRIPTION OF THE PREFERRED EMBODIMENT

Figure 1:
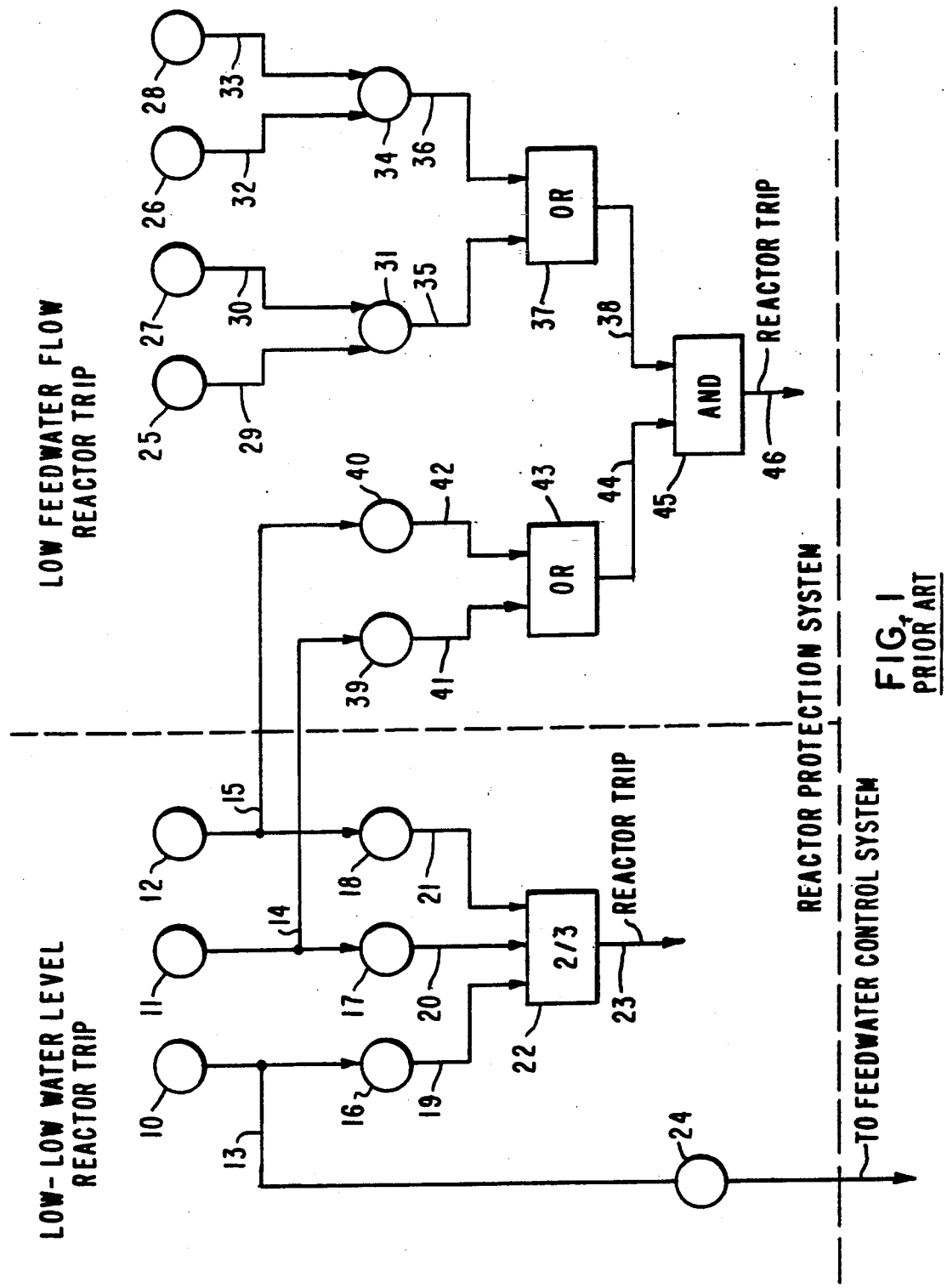
FIG. 1 illustrates a prior art steam generator low water level reactor protection system.
Figure 2:
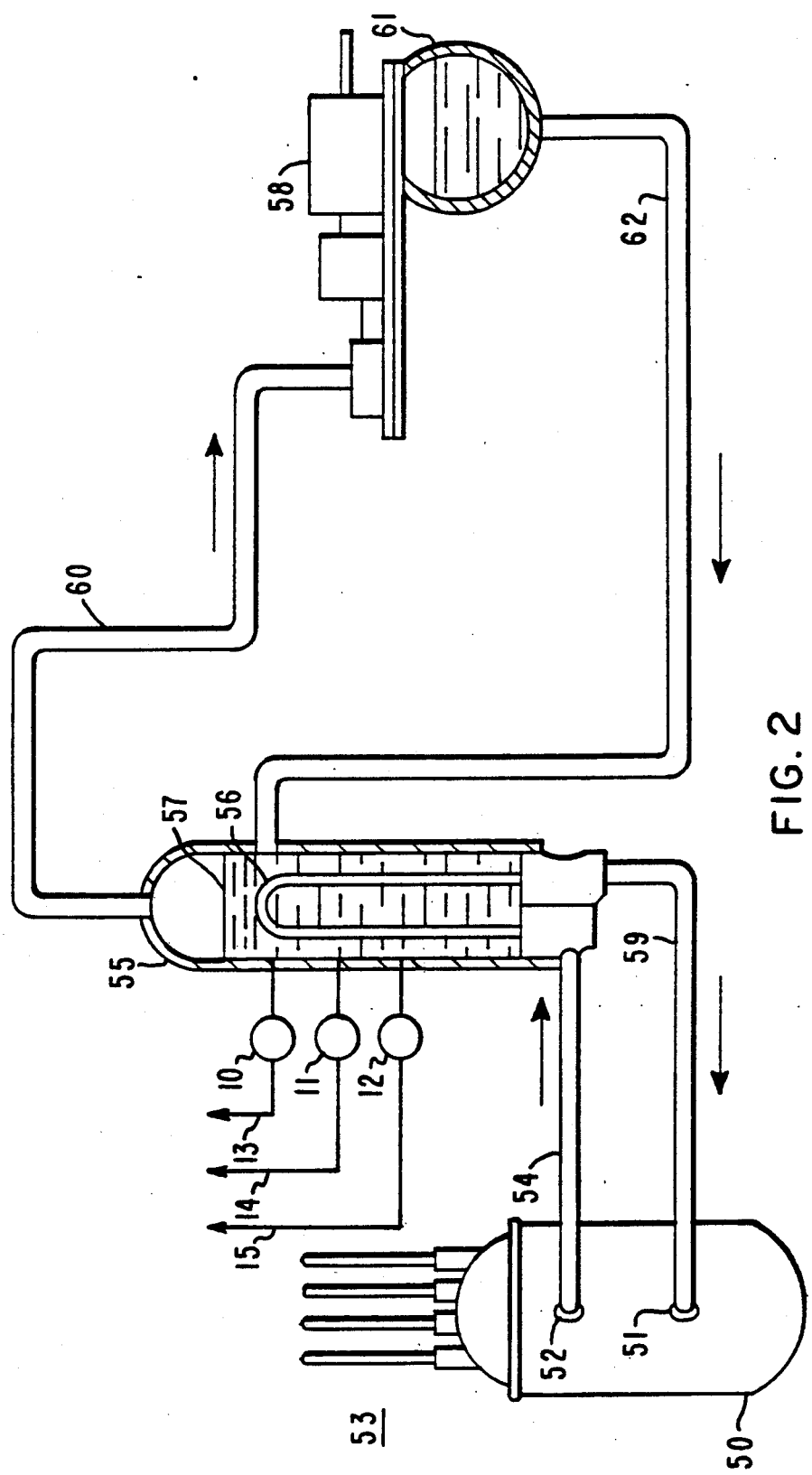
FIG. 2 illustrates a simplified representation of a typical pressurized water reactor-steam generator system.

FIG. 2 illustrates a simplified schematic representation of a typical pressurized water reactor-steam generator system in which the method and apparatus of the present invention to provide a median signal selector for feedwater control systems may be employed. Like reference numerals are employed among the various figures to designate like elements. The reactor vessel 50 has coolant flow inlet means 51 and coolant flow outlet means 52. The vessel 50 contains a nuclear core (not shown) consisting mainly of a plurality of clad nuclear fuel elements which generate substantial amounts of heat, depending primarily upon the position of control rods 53. The heat generated by the reactor core is conveyed from the core by coolant flow entering through inlet means 51 and exiting through outlet means 52. The flow exiting through outlet means 52 is conveyed through an outlet conduit 54 to a heat exchange steam generator system 55. The heated coolant is conveyed through heat exchange tubes 56 which are in a heat exchange relationship with water 57 which is used to produce steam. The steam produced by the steam generator 55 is utilized to drive a turbine 58 for the production of electricity as described more fully below. The flow of the coolant is then conveyed from the steam generator 55 through an inlet conduit 59 to inlet means 51. Thus, a closed recycling primary loop couples the reactor vessel 50 and the steam generator 55. The system shown in FIG. 2 is illustrated with one closed fluid flow loop although the number of loops and hence the number of steam generators 55 varies from plant to plant and commonly two, three, or four are employed.

The secondary side of the steam generator 55 is isolated from the primary loop by the heat exchange tubes 56. The water 57 in the steam generator 55 is placed into a heat exchange relationship with the primary coolant, whereby the water 57 is heated and converted to a vapor or steam. The vapor flows through a steam conduit 60 to the turbine 58. The steam, after passing through the turbine 58, is condensed in a condenser 61. The condensate or water is returned to the secondary side of the steam generator 55 through conduit 62. Thus, a recycling, secondary loop couples the steam generator 55 to the turbine 58.

Completing the description of the system shown in FIG. 2, three water level channels 10, 11 and 12 measure the level of the water 57 in the steam generator 55 and generate water level signals 13, 14 and 15, respectively, representative of the water level 57 in steam generator 55.

Figure 3:
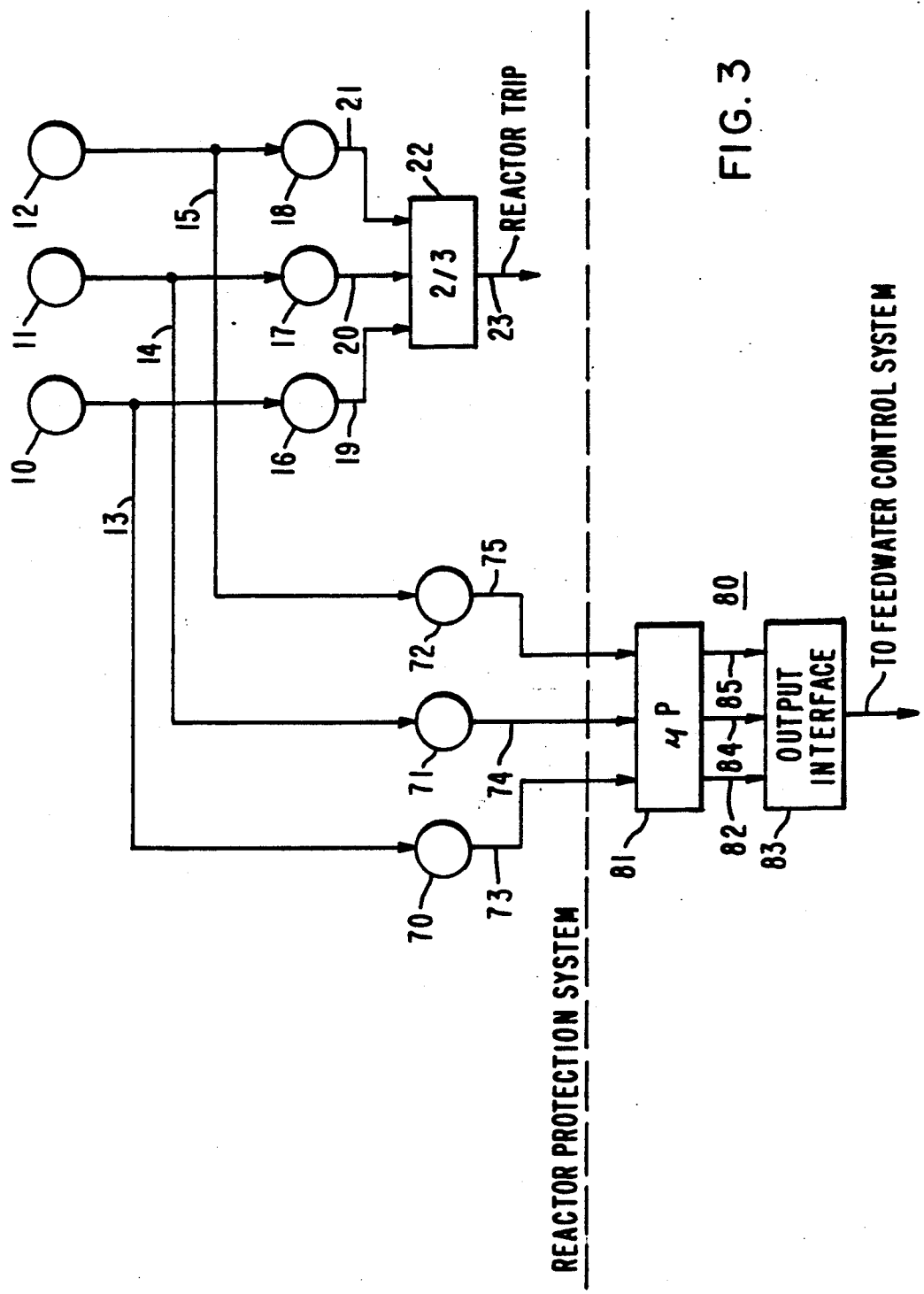
FIG. 3 illustrates a steam generator low water level reactor protection system and nuclear power plant feedwater control system constructed according to the teachings of the present invention.

A steam generator low water level reactor protection system and feedwater control system constructed according to the teachings of the present invention is shown in FIG. 3. The reactor protection system is constructed as follows. Water level signals 13, 14 and 15 generated by water level channels 10, 11 and 12, respectively, are input to water level comparators 16, 17 and 18, respectively. The water level signals 13, 14 and 15 are compared by water level comparators 16, 17 and 18, respectively, to a predefined steam generator water level set point. Low-low water level signals 19, 20 and 21 from water level comparators 16, 17 and 18, respectively, are input to coincidence gate 22. A low-low water level indication from any two of signals 19, 20 and 21 will cause a signal 23 to be generated which is available at an output of coincidence gate 22 to thereby initiate a reactor trip. A reactor trip is accomplished by inserting control rods 5 (shown in FIG. 2) into the nuclear core (not shown) to take the reactor to a subcritical state.

Water level signals 13, 14 and 15 also serve as inputs to the feedwater control system. Water level signals 13, 14 and 15 are input to the feedwater control system through electrical isolation devices 70, 71 and 72, respectively. Electrically isolated water level signals 73, 74 and 75 from isolation devices 70, 71 and 72, respectively, serve as inputs to microprocessor 81 which is programmed to serve as the median signal selector 80. Signal 82, representative of the median water level signal, alarm signal 84 and feedwater control system operating mode signal 85 are output through known output interface 83 to the feedwater control system.

Figure 4:
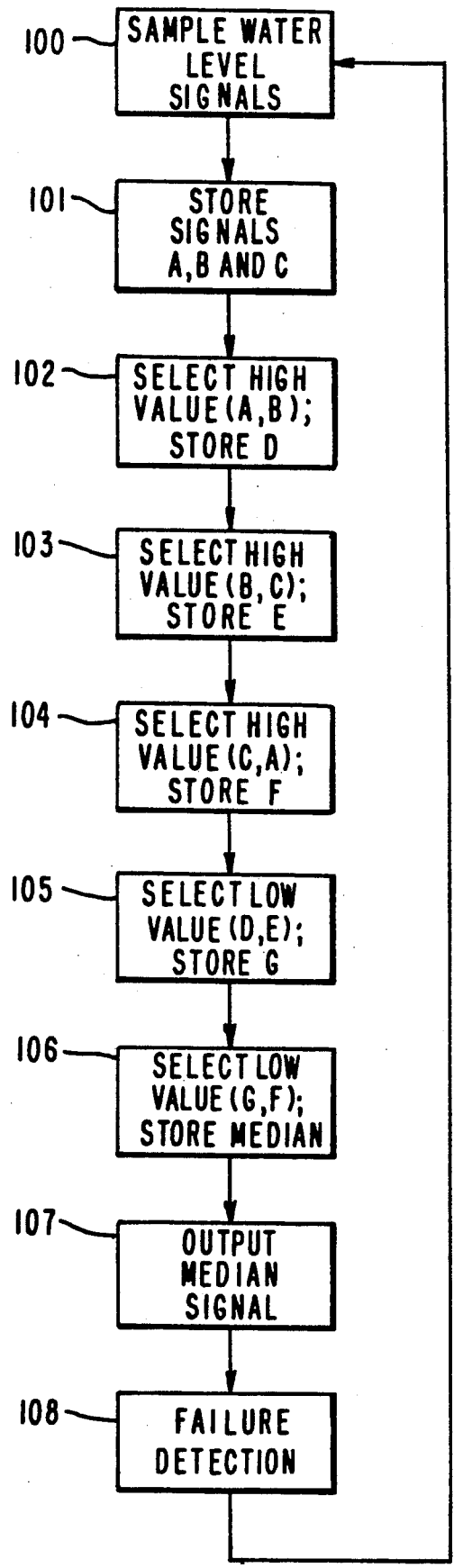
FIG. 4 illustrates a flow chart for a median signal selector constructed according to the teachings of the present invention.

The operation of the median signal selector 80 may be implemented as illustrated in the flow chart of FIG. 4. The flow chart begins at step 100 where the microprocessor 81 of FIG. 3, through known data acquisition techniques, samples the electrically isolated water level signals 73, 74 and 75. In step 101, electrically isolated water level signal 73 is stored in microprocessor 81 memory as Signal A; electrically isolated water level signal 74 is stored in microprocessor 81 memory as Signal B; electrically isolated water level signal 75 is stored in microprocessor 81 memory as Signal C. The microprocessor 81 then selects the high value between Signal A and Signal B in step 102 and stores the high value in microprocessor 81 memory as Signal D. Program control continues at step 103 where the high value between Signal B and Signal C is selected and stored in microprocessor 81 memory as Signal E. The microprocessor 81, in step 104, then selects the high value between Signal C and Signal A and stores the selected value in microprocessor 81 memory as Signal F. Program execution continues at step 105 where the low value between Signal D and Signal E is selected and stored in microprocessor 81 memory as Signal G. The microprocessor 81 determines the median signal as between Signal A, Signal B, and Signal C in step 106 where the low value between Signal G and Signal F is selected. The median signal 82 is then output by microprocessor 81 in step 107 to the feedwater control system through output interface 83.

An example of the operation of the median signal selector 80 follows. Suppose that Signal A, Signal B and Signal C are signals representing 30%, 40% and 50% of maximum steam generator water level. After the high values are selected in steps 102, 103 and 104, Signal D, Signal E, and Signal F are each equal to 40%, 50% and 50% of maximum steam generator water level, respectively. Selection of the low value between Signal D and Signal E in step 105 yields a Signal G of 40% of maximum steam generator water level. Finally, the low value as between Signal G and Signal F, the median signal 82, is equal to 40% of maximum steam generator water level. Thus, the median signal selector 80 will always select the median of Signal A, Signal B and Signal C. A failure high or low of any water level channel 10, 11 or 12 (FIG. 3) will result in the corresponding water level signal 13, 14 or 15, respectively, being rejected by the median signal selector 80 thereby preventing the failure from causing a control system disturbance and initiating a transient which may require protective action.

Several failure detection features may also be implemented in the median signal selector 80. These failure detection routines are functionally represented in step 108 of the flow chart of FIG. 4. If the value of any of the electrically isolated water level signals 73, 74 or 75 differs from the value of either of the remaining two signals by more than an allowable predetermined difference value, an alarm signal 84 is generated by microprocessor 81 and is output to the feedwater control system through output interface 83. Additionally, if the value of any of the electrically isolated water level signals 73, 74 or 75 is greater than a predetermined high limit signal value or is less than a predetermined low limit signal value, an alarm signal 84 is generated by microprocessor 81 and is output to the feedwater control system through output interface 83. In either case, the median signal 82 as calculated in step 106 is output to the feedwater control system through output interface 83 in step 107.

The detection of a failure of any two electrically isolated water level signals 73, 74 or 75 (difference value, out-of-range) will cause the microprocessor 81 to generate a signal 85 output to the feedwater control system through output interface 83 to effect a transfer of the feedwater control system from automatic to manual. The last median signal 82 calculated by microprocessor 81 in step 106 of the flow chart of FIG. 4 prior to the failure detection will be output through output interface 83 to the feedwater control system in step 107.

The median signal selector 80 eliminates the need to postulate the second random water level channel failure as required by standard IEEE-279 because the initiating water level channel failure does not result in a nuclear power plant condition requiring protective action. The median signal selector 80 prevents the failure of a single water level channel 10, 11 or 12 from initiating a feedwater control system transient. It is not necessary, therefore, to postulate the second random failure and, thus, two out of three water level channels 10, 11 and 12 remain in service. These two remaining water level channels are sufficient to satisfy the two out of three reactor trip logic implemented in the low-low water level reactor trip. The low feedwater flow reactor trip logic is, therefore, no longer required. The median signal selector 80 has eliminated the need for the low feedwater flow reactor trip thereby eliminating the need for the feedwater flow channels 27 and 28 and the steam flow channels 25 and 26 in the reactor protection system.

While the present invention has been described in connection with an exemplary embodiment thereof, it will be understood that many modifications and variations will be readily apparent to those of ordinary skill in the art. This disclosure and the following claims are intended to cover all such modifications and variations.

What is claimed is:

1. A system for improving the performance of nuclear power plant feedwater control systems and simplifying steam generator low water level reactor protection logic, comprising:
    means for redundantly measuring steam generator water level and generating a plurality of signals representative thereof;
    means for selecting a median steam generator water level signal from among said plurality of steam generator water level signals; and
    means for communicating said median steam generator water level signal to the feedwater control system.

2. The system of claim 1 wherein said means for selecting said median steam generator water level signal includes a microprocessor responsive to said means for generating said plurality of steam generator water level signals.

3. The system of claim 2 wherein said means for communicating said median steam generator water level signal includes an output interface responsive to said microprocessor.

4. The system of claim 3 wherein said plurality of steam generator water level signals includes three signals designated as Signal A, Signal B and Signal C.

5. The system of claim 4 wherein said microprocessor is programmed first to select the high signal value as between Signal A and Signal B and store this value in said microprocessor memory as Signal D, second to select the high signal value as between Signal B and Signal C and store this value in said microprocessor memory as Signal E, third to select the high signal value as between Signal A and Signal C and store this value in said microprocessor memory as Signal F, fourth to select the low signal value as between Signal D and Signal E and store this value in said microprocessor memory as Signal G, and finally to select the low signal value as between Signal F and Signal G and store this value in said microprocessor memory as said median steam generator water level signal.

6. The system of claim 4 additionally comprising means for detecting the failure of said means for redundantly measuring steam generator water level.

7. The system of claim 6 wherein said means for detecting failure includes means for detecting whether any of said steam generator water level signals differs from the other steam generator water level signals by more than a predetermined difference value and communicating an alarm signal to the feedwater control system through said output interface.

8. The system of claim 7 wherein said means for detecting failure further includes means for detecting whether any of said steam generator water level signals is greater than a predetermined high limit signal value or whether any of said steam generator water level signals is less than a predetermined low limit signal value and communicating an alarm signal to the feedwater control system through said output interface.

9. The system of claim 8 wherein said means for detecting failure further includes means for detecting whether any two of said means for redundantly measuring steam generator water level has failed and communicating a signal to the feedwater control system through said output interface to change a feedwater control system status from automatic to manual.

10. A method for improving the performance of nuclear power plant feedwater control systems and simplifying steam generator low water level reactor protection logic, comprising the steps of:
    redundantly measuring steam generator water level and generating a plurality of signals representative thereof;
    selecting a median steam generator water level signal from among said plurality of steam generator water level signals; and
    communicating said median steam generator water level signal to the feedwater control system.

11. The method of claim 10 wherein said step of selecting said median steam generator water level signal includes the steps of first selecting the high signal value as between Signal A and Signal B and storing this value as Signal D, second selecting the high signal value as between Signal B and Signal C and storing this value as Signal E, third selecting the high signal value as between Signal A and Signal C and storing this value as Signal F, fourth selecting the low signal value as between Signal D and Signal E and storing this value as Signal G, and finally selecting the low signal value as between Signal F and Signal G and storing this value as said median steam generator water level signal.

12. The method of claim 11 additionally comprising the step of detecting the failure of said measurement of said steam generator water level.

* * * * *